United States Patent [19]

Evans

BEST AVAILABLE COPY

[11] E Re. 29,066

[45] Reissued Dec. 7, 1976

[54] BIODEGRADABLE RADIOACTIVE PARTICLES

[75] Inventor: Roger L. Evans, Sunfish Lake, Minn.

[73] Assignee: Minnesota Mining and Manufacturing Company, St. Paul, Minn.

[22] Filed: Mar. 15, 1974

[21] Appl. No.: 451,438

[44] Published under the second Trial Voluntary Protest Program on March 2, 1976 as document No. B 451,438.

Related U.S. Patent Documents

Reissue of:

[64] Patent No.: 3,663,685
Issued: May 16, 1972
Appl. No.: 717,965
Filed: Apr. 1, 1968

[52] U.S. Cl. ..... 424/1; 250/303; 252/301.1 R; 264/0.5; 424/35

[51] Int. Cl.[2] ..... A61K 43/00; A61K 9/14

[58] Field of Search ..... 252/301.1 R; 264/0.5; 424/1, 9, 20, 35, 36

[56] References Cited

UNITED STATES PATENTS

| | | | |
|---|---|---|---|
| 3,061,510 | 10/1962 | Numerof et al. | 424/1 |
| 3,121,041 | 2/1964 | Stern et al. | 424/1 |
| 3,127,313 | 3/1964 | Glenn | 424/1 |
| 3,137,631 | 6/1964 | Soloway | 264/4 |
| 3,202,731 | 8/1965 | Grevenstuk et al. | 252/316 |
| 3,329,817 | 7/1967 | Walz | 252/301.1 |
| 3,334,050 | 8/1967 | Grotenhuis et al. | 424/1 |
| 3,351,049 | 11/1967 | Lawrence | 252/301.1 |
| 3,499,962 | 3/1970 | Wurzburg et al. | 424/35 |
| 3,674,900 | 7/1972 | Thompson | 424/1 |

*Primary Examiner*—Leland A. Sebastian
*Assistant Examiner*—Christine M. Nucker
*Attorney, Agent, or Firm*—Alexander, Sell, Steldt & DeLaHunt

[57] ABSTRACT

Particles, preferably substantially spherical particles having a smooth outer surface and essentially void-free interior are produced, consisting essentially of solid, cold-water insoluble vehicle comprising a physiologically acceptable, parenterally metabolizable protein or polysaccharide having dispersed therein a water-insoluble carrier loaded with radioisotopes, which are substantially non-leachable upon short term exposure to cold water. Such particles can be administered parenterally for diagnostic purposes, or for treatment with radioactive materials. On administration in this way, they are broken down or solubilized by the body fluids over a predeterminable period ranging from minutes to several days, whereupon the radioisotopic material is excreted from the body thus limiting exposure to the radiation.

16 Claims, No Drawings

BIODEGRADABLE RADIOACTIVE PARTICLES

Matter enclosed in heavy brackets [ ] appears in the original patent but forms no part of this reissue specification; matter printed in italics indicates the additions made by reissue.

BACKGROUND OF THE INVENTION (1) Field of the invention

It has heretofore been known to encapsulate natural products for food or pharmaceutical use in proteinaceous materials, such as gelatin and albumin, and even small spherical particles of such encapsulated materials have been made, e.g. by processes such as those disclosed in U.S. Pats. 3,137,631; 3,016,308; 3,202,731; 2,800,457 and the like. These prior art processes, however, either produce capsular materials wherein a central core is surrounded by a thin shell, e.g. albumin or gelatin; or, for purposes of obtaining materials that can be handled, or stored under adverse conditions, result in severe denaturization of the protein so that its solubility and other properties are impaired. Such materials are not suitable for parenteral administration in the animal organism. Similarly, while the use of radioisotope-labeled particulates parenterally in the animal body is known for diagnostic and treatment purposes, the materials heretofore used for such purposes have been relatively insoluble, very finely divided irregular or spherical particles which, when used, lodge in the body and remain there during substantially the entire life of the radioisotope. Such particles, for example, are shown in U.S. Pats. 3,334,050 and 3,147,225. While these are very useful for certain purposes where long-continued radioisotopic treatment, for example, is desirable and advantageous, there are other areas in which their use is less desirable and in some instances may be contra-indicated. Irregular macroaggregates of human serum albumin, labelled with radionuclides, have been used for diagnostic purposes. These materials cannot be prepared in narrow ranges of particle size and are prepared in particulate form directly in the solution in which they are to be used; they cannot be dried and sized or otherwise treated, and then resuspended.

SUMMARY OF THE INVENTION

The present invention provides means to prepare certain physiologically acceptable, parenterally metabolizable materials in spherical form, in highly pure, undenatured condition so that these can be administered parenterally as a solid without injury to the organism, and containing dispersed therein in a carrier radioisotopes which are useful for diagnostic, prophylactic and treatment purposes. The invention also contemplates the provision of a process for making such particles and their concomitant or subsequent treatment to incorporate radioisotopes therein, and to modify their solubility characteristics without bringing about denaturization which would prevent their absorption in the body.

Hereinafter, the material of which the particle, or matrix, in which the radioactive material is dispersed, is termed the "vehicle"; and the substance upon which the radioactivity is absorbed is called the "carrier."

The particulate compositions of the invention comprise a physiologically acceptable, solid, substantially water-insoluble (at body temperature) vehicle which can be metabolized, or degraded in a manner which does not form toxic residues, apparently by the enzymes or other metabolic mechanisms in the parenteral body fluids, such as blood, serum, plasma, lymph and the like. When so metabolized or degraded, these substances are solubilized.

Dispersed in this vehicle is a relatively water-insoluble carrier for radioisotopic ions, and this carrier is required to be physiologically acceptable so as to be free from injurious toxic effects when released in the body by the metabolic mechanisms which solubilize the vehicle. The carrier further binds or contains the radioisotopes, as by ion exchange, or by incorporating the radioisotope ion as part of the carrier, e.g. as the anion or cation of a salt.

Suitable vehicles for the particulate compositions of the invention are physiologically acceptable proteinaceous substances such as albumin, gelatin, hemoglobin and the like; and polysaccharides, such as starch, glycogen, dextran, etc.

The carrier can be loaded with radioisotopes by insoluble salt formation, e.g. by forming silver iodide by reaction of silver nitrate with hydriodic acid, a portion of which is $HI^{131}$; or by reacting barium chloride with a solution of sulfuric acid containing a certain amount of $S^{35}$ as sulfate ion. Another method of introducing a radioisotope into a carrier is by ion exchange or absorption, e.g. by absorbing $Ce^{144}$ on ferric or aluminum hydroxide.

Suitable carriers include, for example, hydroxides of iron, chromium, aluminum and manganese; sulfates of barium, strontium and calcium, and sulfides of zinc, copper, tin, nickel and cobalt. Other metal salts which function usefully as carriers include chromates, e.g. of barium; halides, e.g. of silver; and carbonates, e.g. of calcium. These carriers have solubility product of the order of $1\times10^{-4}$ or less. The carrier is employed in amount at least sufficient to bind the radioisotope in the quantity used, but preferably is in excess thereof. Thus, up to about 50% of carrier can be used, based on the weight of the vehicle. Preferably about 1 to 10% of carrier is incorporated in the vehicle.

For use in diagnostic procedures or treatment requiring radioisotopes to be directed to a particular locale within the body, the vehicle is prepared in finely divided state, the sizes of the particles being closely controlled by sorting techniques so as to be in a narrow size range adapted to the specific use. Particles thus segregated into narrow ranges can be from about ½ to 1000 microns in average diameter and preferably the size ranges chosen do not vary more than about plus or minus 20% from the mean.

Preferably, spheroidal or essentially spherular particles are employed as being more uniform and more easily controlled with respect to radioisotope content and time of elimination from the body. Spherules from ½ to 60 microns in diameter are most useful for diagnostic purposes. Larger spherules, even up to 1 millimeter in diameter, can be used for certain therapeutic purposes. Being uniform in their dimensions, spheroidal or spherular particles are more easily controlled with respect to radioisotope content and time of elimination from the body. Particularly, they are preferred because, by matching the diameter of the spherules to the size of body passages, e.g. arteries, capillaries, etc., one can predict their route through a healthy body and determine where they should lodge with high accuracy.

To make the particles of the invention, a convenient method consists in forming a sol by dispersing the vehicle, e.g. a suitable protein or polysaccharide, in warm water, adding an amount of finely divided carrier with bound radioisotope (which can readily be an amount calculated to provide a desired level of radioactivity for each gram of the product after drying), and mixing until homogeneous, then causing the vehicle to gel as by cooling or removing water, followed by drying. The dried material can be comminuted by grinding or the like to form particles of the size desired, grading by sieves or the like being entirely feasible.

Preferably, however, the aqueous vehicle containing the carrier and bound radioisotope is formed directly into tiny spheroids or spherules by causing gelation to take place in that form. While these gelled particles are prevented from coalescing, the water is removed and the particles are dried to a free-flowing, unagglomerated form.

When thus prepared, the essentially cold water-insoluble particles can be washed to remove surface contamination by radioisotopes. They can be subjected to heat treatment to modify their solubility, and screened or otherwise graded to desired size range. They can be soaked in water at 37° C. for at least 15 minutes without leaching out any radioactivity. In many cases they can be thus treated for periods of hours or even days without disintegration or loss of radioactivity. In physiological fluids such as blood serum, however, they soon begin to be broken down and eventually are completely solubilized.

Thus, for example, it has been found that by dispersing a solution of albumin, e.g. by stirring into warm, inert fluid which is immiscible with the solution of albumin and in which the albumin itself is not soluble, small spherules of the albumin are formed. The speed of stirring, use of baffles and the like controls the size of the particles obtained; empirical methods are used to establish parameters of dispersion to yield spheroidal particles of any particle size. Alternatively and preferably for continuous production, tiny droplets of the aqueous liquid are injected through a small orifice into a moving stream of the warm, inert fluid. The water is removed from the albumin solution through the medium of the warmed, inert fluid, which may be e.g. vegetable oil or hydrocarbon solvents, so that dry, practically perfectly round, free-flowing tiny spherules of albumin are obtained. These spherules are from 1 to 500 microns or even up to a millimeter in diameter and can be obtained through the process in very narrow, pre-determined size distribution ranges. They are substantially undenatured, and can be administered parenterally in the animal organism. When so administered, it is surprisingly found that they are readily broken down, probably by the enzymes in the body fluids, and converted to soluble form.

The microspherules, e.g. of albumin, are made to contain radioisotopes by incorporating the selected carrier with radioisotopic material into the solution of albumin before it is dispersed in the inert fluid. Alternatively, the vehicle is prepared containing unlabelled carrier. These are treated with a radionuclide solution. The spherules, while free from visible voids or bubbles, apparently are porous enough to permit the radionuclide to penetrate into the interior of the particle where it is absorbed upon the carrier. This procedure is especially useful with radionuclides with very short half-life; e.g. indium 113m, as the absorption process requires a very short time and the particles can be prepared in advance and treated with radionuclide immediately before use. The radioisotopes cannot be leached from the resulting radioactive spherules upon immersion in water for periods of time of from about 15 minutes up to several days.

The albumin referred to herein is broadly any of the several natural proteins which are so described. Such albumins include those of egg, blood serum, milk and the like, as obtained from various animal species. For the purposes of this invention, the preferred albumins are animal albumins from serum, human serum albumin, and in general, for eventual use in a given animal organism, albumin obtained from the serum of that organism. Polysaccharides work equally well in this process.

Spherules formed from sol-forming proteins do not shrink greatly during drying; however, spherules formed from polysaccharides may shrink up to 30% in diameter as they dry. Suitable allowance for such shrinkage must therefore be made when particles of a particular size are sought.

Suitable inert liquids for the process of making the spherules of the invention include vegetable oils, for example, corn oil, olive oil and the like; low melting animal fats; mineral oils, particularly those having boiling points above about 150° C.; inert halogenated hydrocarbons, and the like. The function of the inert liquid is to remove water from the protein and to cause gelling, and it will be apparent that various solvents can be used to accomplish this end.

The radioisotopes which can be incorporated into the spherical particles of albumin include such materials as cerium-144, iodine-131, yttrium-90, indium-114, indium-113, ytterbium-169, technetium-99, and any other radionuclide which is capable of existing in ionic form and of forming a salt or other solid derivative. These are of course selected with respect to the type and intensity of emitted radiation, to be adapted to the use for which the particles are intended.

For use in diagnostic procedures, a suspension of the particles of the invention, such as microspherules of albumin containing a radionuclide, are suspended in a pharmaceutical extending medium suitable for parenteral administration. This may be, e.g., physiological saline, or dextran or gelatin solutions. A quantity of such a composition containing the desired amount of radioactivity, e.g. one millicurie, is injected e.g. intravenously into the animal body. The material thus injected circulates throughout the body in the blood stream and, because of the selected particle size, will lodge in a particular, predetermined organ, e.g. the lung. Radiation detectors, or autoradiography, may then be employed to visualize the organ. Because the microspherical particles remain substantially intact for a short time in the animal organism, a period of time ranging up to several days is available for such diagnostic procedure. Thereafter, the body enzymes begin to attack the vehicle, causing it to become solubilized and absorbed. The radioisotopic material, or its decay product, is, however, swept away from the localized area in the blood stream and excreted, generally by the kidneys.

For therapeutic or prophylactic use, the products are administered as described above except that the activity is usually much higher, (e.g. 50 millicuries) and the biodegradability of the particles is adjusted so as to retain the radionuclide until it has delivered the energy required for these purposes.

It will be apparent that the particular vehicle or carrier chosen to prepare the particles of the invention which convey radioisotopes into predetermined, temporary location in the body is not critical. It is only necessary that the vehicle be physiologically acceptable, capable of being prepared in essentially insoluble form with respect to water at 37° C. for at least a short period, and capable of being metabolized or degraded by body fluids to soluble form. Likewise, the carrier is not critical so long as it is likewise essentially insoluble in water and binds the radioisotope so as to prevent radioactivity from being leached out of the particles when soaked in water at 37° C. for a period of at least 15 minutes.

The following specific examples will more clearly illustrate the specific embodiments of the invention. In these examples, all parts are by weight unless otherwise specified. As a practical matter, radioactive materials are in terms of their radiation level rather than by exact weight and wherever radiation level is mentioned, this is the exact amount of radionuclide used.

EXAMPLE 1

A solution was prepared containing 80 milligrams of ferric chloride and about 1 milligram of cerium$^{144}$ chloride (activity 5 millicuries) in .2 ml. of water. While stirring 10 percent aqueous sodium hydroxide solution was slowly added until the pH of the mixture was about pH 7–7.5. A gelatinous precipitate of ferric hydroxide containing about 5 millicuries of radiocerium was formed. This was washed by centrifugation and decantation with distilled water.

The precipitate thus prepared was added to 4 ml. of a 25 percent solution of human serum albumin in water. The mixture was carefully stirred until homogeneous, avoiding the formation of bubbles. The resulting mixture was then injected through a hypodermic needle into about 1 liter of vegetable oil (cottonseed oil) which was heated to about 30–50° C. The rate of stirring determines the ultimate size of the spherular material obtained. Using a container which is greater in height than in diameter, with a 25 gauge hypodermic needle and stirring at about 500 r.p.m. with a 2½ inches propeller-type stirrer, microspherular particles of about 10 to 20 microns in diameter are obtained. Stirring is continued while heating to 110° C. until all of the water in the microspheres is removed, as may be determined by removal from the mixture of a small number of spheres to determine whether or not they are still tacky. After removal of the water, the particles are filtered away from the oil and washed with diethyl ether. Microspherular particles of human serum albumin as a vehicle, with radiocerium contained therein carried upon ferric hydroxide, are obtained. The microspheres are about 10 to 20 microns in diameter and are unagglomerated, free-flowing brown color.

The spherules thus obtained are washable in water at 37° C. When suspended in physiological saline solution, the spherules are biodegraded and are 50% solubilized in less than a day after injection into test animals.

Somewhat higher temperatures can be employed in the process, accompanied by an increase in the time required for biodegradation. Thus, for example, the oil is heated to 135° C. and maintained there for 40 minutes while stirring. Again, free-flowing, unagglomerated particles of human serum albumin containing radiocerium in ferric hydroxide carrier are recovered. These are biodegraded and solubilized to the extent of 50% in about one day.

Lower temperatures can be used for drying by heating at subatmospheric pressures conveniently by using a water aspirator or with a vacuum pump, reducing the temperature in proportion to the reduction of pressure. Particles thus produced are biodegraded and solubilized to the extent of 50% in less than a day.

Particles heated at 160° C. are 50% solubilized in the animal body in about 3½ days; at 170° C., in about 3¾ days; and at 190° C., in over thirty days.

Similarly, when egg albumin is employed instead of human serum albumin, spherular particles are obtained which closely resemble the particles from human serum albumin.

A homogeneous mixture is made containing 0.1 g. of finely divided radiobarium sulfate ($S^{35}$, 0.5 millicurie) in 4 ml. of 25% aqueous human serum albumin, and converted into spherules as described above, drying at 110–130° C. Free-flowing, cream-colored radioactive spherules about 10–20 microns in diameter are thus prepared.

In the same way, one millicurie of finely divided radio technetium sulfide ($Tc^{99m}$) is dispersed in 4 ml. of 25% aqueous human serum albumin and formed into 10–20 micron spherules. The radioactivity of the particles has a short half-life.

EXAMPLE 2

Tiny spherical particles of albumin similar to those obtained in Example 1 are also prepared as follows:

A solution containing 100 milligrams of ordinary, non-radioactive sodium iodide in 8 ml. of water is mixed with 5 ml. of water containing 5 millicuries of sodium iodide$^{131}$. To this solution is added 10 percent aqueous silver nitrate, with stirring, until an excess of silver nitrate is present and no more silver iodide precipitates. The precipitate is centrifuged down, the supernatant liquid decanted, and washed with distilled water by repeatedly suspending the precipitate in water and centrifuging, decanting the supernatant liquid, until the washings are free from soluble silver iodide. The precipitate is carefully mixed into 4 ml. of a 25 percent aqueous human serum albumin solution, avoiding the incorporation of air bubbles, until the mixture is homogeneous. The resulting albumin-silver iodide mixture is injected into warm corn oil to form spherules, which are dried, as described in Example 1. Brown, free-flowing, unagglomerated spherules about 10 to 20 microns in diameter, containing silver nitrate in which an amount of radioactive iodine$^{131}$ is carried are thus obtained.

Alternatively, 300 microliters of water containing 2 millicuries of radioiodine$^{131}$ as radioactive sodium iodide is mixed with 100 microliters of a 3 molar solution inactive sodium iodide as a carrier. This solution is mixed with 4 ml. of 25% aqueous human serum albumin. Vigorous stirring is used, avoiding bubble formation. Continuing the stirring, 125 microliters of 3 molar aqueous silver nitrate solution is slowly added. The solution becomes primrose yellow in color as colloidal silver iodide is formed.

The colloidal suspension of silver iodide in albumin thus formed is made into microspherules as described in Example 1.

EXAMPLE 3

Radionuclide-free microspheres of albumin with ferric hydroxide are made as described in Example 1, drying at 110–130° C., but leaving out the radiocerium chloride. These dry, free-flowing 10–20 micron spherules are readily loaded with radionuclides as follows:

About one gram of the microspheres is added to a solution 5 millicuries of radiocerium chloride in 10 ml. of water. The mixture is agitated gently for 10 minutes at 37° C. After filtration or centrifugation and washing over 60% of the radioactivity originally present in the liquid is found to be firmly fixed or absorbed in the spherules. Alternatively, ferric hydroxide is prepared as a swollen gelatinous precipitate from ferric chloride solution by carefully neutralizing it with dilute sodium hydroxide solution. This precipitate is washed by centrifugation and decantation with aliquots of water to remove excess alkali. Four ml. of 25% aqueous human albumin is added to 0.1 gm. of the ferric hydroxide (dry basis) and the system is carefully mixed until it is homogeneous. This mixture is then formed into spherules as described in Example 1.

After drying at 110–130° C., the spherules are placed in a solution of radioindium chloride with gentle agitation. Contact is maintained until the desired amount of radioactivity has been taken up by the beads. For example, in a solution originally containing 233,550 counts per minute of $In^{114}$, 60% is taken up in 5 minutes, 79.5% in 2 hours.

An aqueous solution of sodium iodide is prepared containing 12.7 mg./ml. of iodide ion. To 1 ml. of this is added an excess of 10% aqueous silver nitrate solution. The precipitated silver iodide is washed to remove excess silver, and is mixed thoroughly with 0.5 ml. of a 25% aqueous solution of human albumin. The mixture is formed into spherules and dried at 110–130° C. as described in Example 1.

After drying, the spherules are placed in a solution of radioactive sodium iodide ($I^{131}$) and gently agitated. Contact is maintained until the desired amount of radioactivity has been taken up by the spherules. For example, in a solution originally containing 330,420 c.p.m., 99% is taken up in 10 minutes.

Alternatively, a solution of 25% aqueous human serum albumin containing 10% sodium chloride is converted into spherules as described in Example 1, drying at 110–130° C. One hundred milligrams of these are suspended in 20 ml. of acetone and 1 ml. of 3 molar aqueous silver nitrate is added. The suspension is stirred for half an hour at ambient or mildly elevated temperature. Then it is filtered and washed thoroughly with water and acetone. The spherules are again suspended in 10 ml. of acetone and 25 microliters of a solution containing 0.5 millicurie of ratioactive sodium iodide ($I^{125}$) are added. After contacting the spherules with the radioactive solution for 17 hours, 99.75% of the radioiodide has been absorbed as shown by radioassay. The thus labelled spherules are filtered off, washed with water and acetone and dried in air.

Similarly, a solution of 25% albumin containing 0.6% silver nitrate (dry weight basis) is converted into spherular particles in the manner described in Example 1. One hundred milligrams of these are suspended in 10 ml. of water at 18° C.; 25 milliliters of an aqueous solution containing 0.25 millicurie of radioactive sodium iodide ($I^{125}$) are added and the suspension is agitated for one hour. Radio-assay then shows that 67% of the radioiodine has been absorbed. The spherules are filtered off, washed with water and acetone, and dried in air.

EXAMPLE 4

A solution is made by dissolving 1 gram of glycogen in 40 ml. of water, mixing and stirring while avoiding incorporation of bubbles. To this is added about 80 milligrams of ferric hydroxide containing 1 milligram (or about 5 millicuries) of radiocerium, as set forth in Example 1. The mixture is dispersed in a stirred bath of cottonseed oil which is kept at 65° C. until all of the glycogen dispersion has been introduced in the form of small particles. Thereafter stirring is continued and the temperature is raised to 105–110° C. and maintained there until all of the water has been removed from the particles.

The resulting particles, which are free-flowing, unagglomerated, tiny spherules about 10 to 20 microns in diameter, dissolve rapidly in water. To treat these particles to make them less soluble, they are heated at 200° C. in the dry form for 30 minutes. Particles thus treated dissolve in physiological saline solution in approximately 20 minutes. If heating in this manner is continued for two hours, the particles dissolve in physiological saline solution in about 30 minutes. However, no radioactivity is leached from the particles if they are placed in water at 37° C. for 15 minutes. If heated at 200° C. for 13 hours, the particles do not dissolve in physiological saline solution. The particles are more rapidly solubilized in the body fluids than in physiological saline solutions.

Substantially similar results are obtained if a solution of 1 gram of starch phosphate in 10 ml. of water is employed, to which radiocerium carried upon ferric hydroxide is added. The mixture is dispersed into hot oil as set forth herein, and dried, to form tiny, free-flowing, dry spherical particles of starch labelled with radiocerium.

EXAMPLE 5

A solution of one gram of gelatin in 10 ml. of water was mixed with precipitate of indium$^{144}$/ferric hydroxide made according to Example 1. The mixing was continued until the system was homogeneous, conveniently at ca. 60° C. When mixing was complete, the mixture was injected into a liter of rapidly stirred cottonseed oil, also at ca. 60° C. to disperse the gelatin into tiny spherules. The temperature was raised to 110° C. and maintained there until the water was all evaporated. After filtration and washing with ether, spherules of gelatin labelled with radioindium were obtained, about 20–30 microns in diameter as free-flowing, unagglomerated particles.

EXAMPLE 6

A convenient method for continuous production of spheroidal particles is the following: Four parts of a 25% aqueous solution of sodium chloride is thoroughly mixed with 40 parts of a 25% aqueous solution of albumin. The mixture, at room temperature, is passed through a No. 27 needle into a stream of cottonseed oil warmed to about 50° C., moving at the rate of about 12 feet per minute. The albumin-containing mixture breaks up into droplets, which are suspended in the oil. The stream of droplets-in-oil is carried through a 50 ft. long tube, heated to ca. 115° C. This dries the droplets to microspherules of about 20–50 microns diameter.

The oil and dried spherules are run into a tube and after cooling, they are collected, the oil being removed by filtration. After warming again to about 50° C., the oil is recirculated.

Radioactive materials are incorporated into the spherules, when required for use, by the process of post-loading described in Example 3.

What is claimed is:

1. Tiny free-flowing, unagglomerated radioactive particles of the order of about one-half micron to 1 millimeter in largest dimension, consisting essentially of a gelled vehicle of physiologically acceptable parenterally metabolizable sol-forming polysaccharide of the class consisting of glycogen, starch and dextran or protein of the class consisting of albumin, gelatin and hemoglobin having dispersed therein a physiologically acceptable inorganic carrier for radionuclides, said carrier having solubility product less than about $1\times10^{-4}$, said carrier containing a radionuclide and being present in said particles in amount ranging from that which is at least adequate to contain said radionuclide up to about 50% by weight based upon the weight of the vehicle, and said particle being resistant to leaching of said [ radioisotope ] *radionuclide* when immersed in water at 37° C. for at least about 15 minutes.

2. Particles according to claim 1 which are substantially spherular in form.

3. Particles according to claim 1, in which the vehicle [s ] is a protein.

4. Particles according to claim 1, in which the vehicle is a polysaccharide.

5. Particles according to claim 1, in which the carrier is a metal salt.

6. Spherules according to claim 2, wherein the vehicle is albumin and the carrier is a metal salt.

7. Spherules according to claim 2, in which the vehicle is a polysaccharide and the carrier is a metal salt.

8. Spherules according to claim 2, in which the vehicle is albumin and the carrier is ferric hydroxide.

9. Spherules according to claim 2, in which the vehicle is albumin, the carrier is sodium iodide and the radionuclide is $I^{131}$.

10. Spherules according to claim 2, in which the vehicle is albumin, the carrier is ferric hydroxide and the radionuclide is cerium$^{144}$.

11. Spherules according to claim 2, in which the vehicle is albumin, the carrier is technetium sulfide and the radionuclide is technetium $99^{m}$.

12. Spherules according to claim 2, in which the vehicle is glycogen and the carrier is ferric hydroxide.

13. Spherules according to claim 2, in which the vehicle is glycogen, the carrier is ferric hydroxide and the radionuclide is cerium$^{144}$.

*14. Tiny, free-flowing, unagglomerated particles of the order of about one-half micron to one millimeter in largest dimension adapted for containing radionuclides, consisting essentially of a gelled vehicle of physiologically acceptable parenterally metabolizable sol-forming polysaccharide of the class consisting of glycogen, starch and dextran or protein of the class consisting of albumin, gelatin and hemoglobin having dispersed therein a physiologically acceptable inorganic carrier for radionuclides, said carrier having solubility product less than about $1\times10^{-4}$, said carrier being present in said particles in amount ranging from that which is at least sufficient to bind radionuclides in the quantity used up to about 50% by weight based upon the weight of the vehicle, and said particles when administered parenterally in the animal organism, being broken down and converted to soluble form.*

*15. Particles according to claim 14, which are substantially spherical in form.*

*16. Particles according to claim 15, in narrow size range from about one-half to 60 microns in diameter.*

* * * * *